United States Patent [19]
Beighe

[11] Patent Number: 6,055,576
[45] Date of Patent: *Apr. 25, 2000

[54] ACCESS CONTROL TO PACKET TRANSFER BASED ON KEY MATCH STORED IN CABLE MODEM HARDWARE UNIT

[75] Inventor: Ed Beighe, Phoenix, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/650,184

[22] Filed: May 20, 1996

[51] Int. Cl.$^7$ .................................................... G06F 13/36
[52] U.S. Cl. .......................... 709/232; 709/224; 709/250; 370/354; 370/356
[58] Field of Search ........................ 395/200.15, 200.11, 395/200.2, 200.61, 200.62, 200.54, 200.8; 370/355, 354, 356; 709/231, 232, 224, 250

[56] References Cited

U.S. PATENT DOCUMENTS

| | | | |
|---|---|---|---|
| 4,550,401 | 10/1985 | Spears | 370/400 |
| 4,884,266 | 11/1989 | Pflaumer | 370/545 |
| 4,970,714 | 11/1990 | Chen et al. | 370/216 |
| 5,251,213 | 10/1993 | Videlock et al. | 370/403 |
| 5,276,681 | 1/1994 | Tobagi et al. | 370/229 |
| 5,303,302 | 4/1994 | Burrows | 380/49 |
| 5,542,080 | 7/1996 | Yoshida | 395/800.25 |
| 5,550,827 | 8/1996 | Fernstrom | 370/392 |
| 5,606,668 | 2/1997 | Shwed | 395/200.11 |
| 5,608,662 | 3/1997 | Large et al. | 364/724.011 |
| 5,644,718 | 7/1997 | Belove et al. | 395/200.12 |
| 5,884,033 | 3/1999 | Duvall et al. | 709/206 |

*Primary Examiner*—Richard L. Ellis
*Assistant Examiner*—Gautam R. Patel
*Attorney, Agent, or Firm*—Blakely, Sokoloff, Taylor & Zafman LLP

[57] ABSTRACT

A user controlled apparatus and corresponding method for accepting or rejecting a data packet which is being transferred between a client and server over a cable and a cable communication network. A memory system cooperates with a CPU and a cable modem to provide the desired results. The memory system includes applications programs, an applications interface layer, a communications protocol such as TCP/IP layer, a shim and a cable modem driver. The shim layer binds with the TCP/IP layer and the driver by exchanging pointers. The shim intercepts all data packet flow in both directions between the cable modem and the TCP/IP layer. Upon receipt by the shim of a packet received signal, logic intervenes. The logic decides to either pass the packet on or reject it based on the status of a listen flag which may be set by the client and/or the server. If the listen flag is enabled, the packet will be transferred on to the control of the TCP/IP layer by passing the pointers to the stored packet from the shim to the TCP/IP. If the listen flag is not enabled, the packet is rejected by sending a signal to the driver indicating that the packet has been passed on, but not passing on the pointer to the packet to the TCP/IP layer.

13 Claims, 3 Drawing Sheets

ACCESS CONTROL TO PACKET TRANSFER BASED ON KEY MATCH STORED IN CABLE MODEM HARDWARE UNIT

BACKGROUND OF THE INVENTION

1. Field of the Invention

The present invention relates to a system for controlling the transfer of data packets between a client an server over a communication media which is not a switched point to point connection. More particularly, it relates to a system and method for intercepting packets and either passing them or rejecting them based upon packet transfer information supplied by either the client or the server.

2. Description of the Prior Art

Currently most home computers are interconnected with the Internet and other online services by the public telephone network. This network is switched point to point in architecture and has a relatively small bandwidth which was originally designed for analog voice communication. It does not permit broadband data delivery such as multimedia. As a result, there are several efforts to create a broadband data delivery infrastructure for home computer applications. Such an infrastructure when combined with the increasingly powerful home computers that are now available will enable the delivery of rich multimedia programming to the home. In this setting, the home computer will be continuously connected to the broadband network and will be in communication with one or more servers at all times. Data will be transmitted in packets where packets are defined as a block of data with appropriate transmission data attached in the form of a header and footer to be sent or received over a network. This is in contrast with the current environment where access is through a temporary point to point circuit connection through the public telephone network. In this situation, the client controls access to the network by initiating and terminating the connection by "dialing" to connect and "hanging up" to terminate connection to the network.

In the environment where the home computer is always on line, the home computer, sometimes herein called the client, does not now have the ability to control packets of data that it either receives or sends without physically disconnecting from the network which is inconvenient. To have such an ability would be highly useful to a user by providing privacy and cost control in the case where users are charged by the time that they actually receive data. Such a capability could also facilitate control by the supplier since they can easily do an electronic disconnect if the clients do not pay their bills.

SUMMARY OF THE INVENTION

The present invention is an apparatus and corresponding method operating on a data packet which is being transferred between a client and server over a communication network that does not provide a switched point to point connection. The apparatus includes means for maintaining packet transfer information for determining the acceptance of a packet for further communication. The apparatus further includes means for users of the server and the client to modify the packet transfer information. The apparatus further includes means for intercepting a packet. Finally, the apparatus includes means for passing or rejecting intercepted packets based on the status of the packet transfer information. The invention also includes a method of controlling the transfer of a data packet between a client and server over a communication media that is not a switched point to point connection. The first step is to store packet transfer information for determining if a packet is to be transferred further. The next step is to intercept a data packet. The next step is to interrogate the packet transfer information to determine if the intercepted packet is to be further transferred. The next step is to either transfer or reject the intercepted packet based on the outcome of the interrogation of the packet transfer information.

BRIEF DESCRIPTION OF THE DRAWING

The preferred embodiment will now be described in connection with the Drawing wherein.

DESCRIPTION OF THE PREFERRED EMBODIMENT

Broadband data delivery may be accomplished over a variety of different delivery infrastructures. Of these, perhaps the most promising is cable television. Recent advancements in radio frequency ("R/F") modulation and demodulation technology along with a large base of cable television subscribers has made cable television a strong candidate for becoming the preferred provider of broadband services to the home. The preferred embodiment of the present invention will be described using cable television as the delivery infrastructure.

Figure 1:
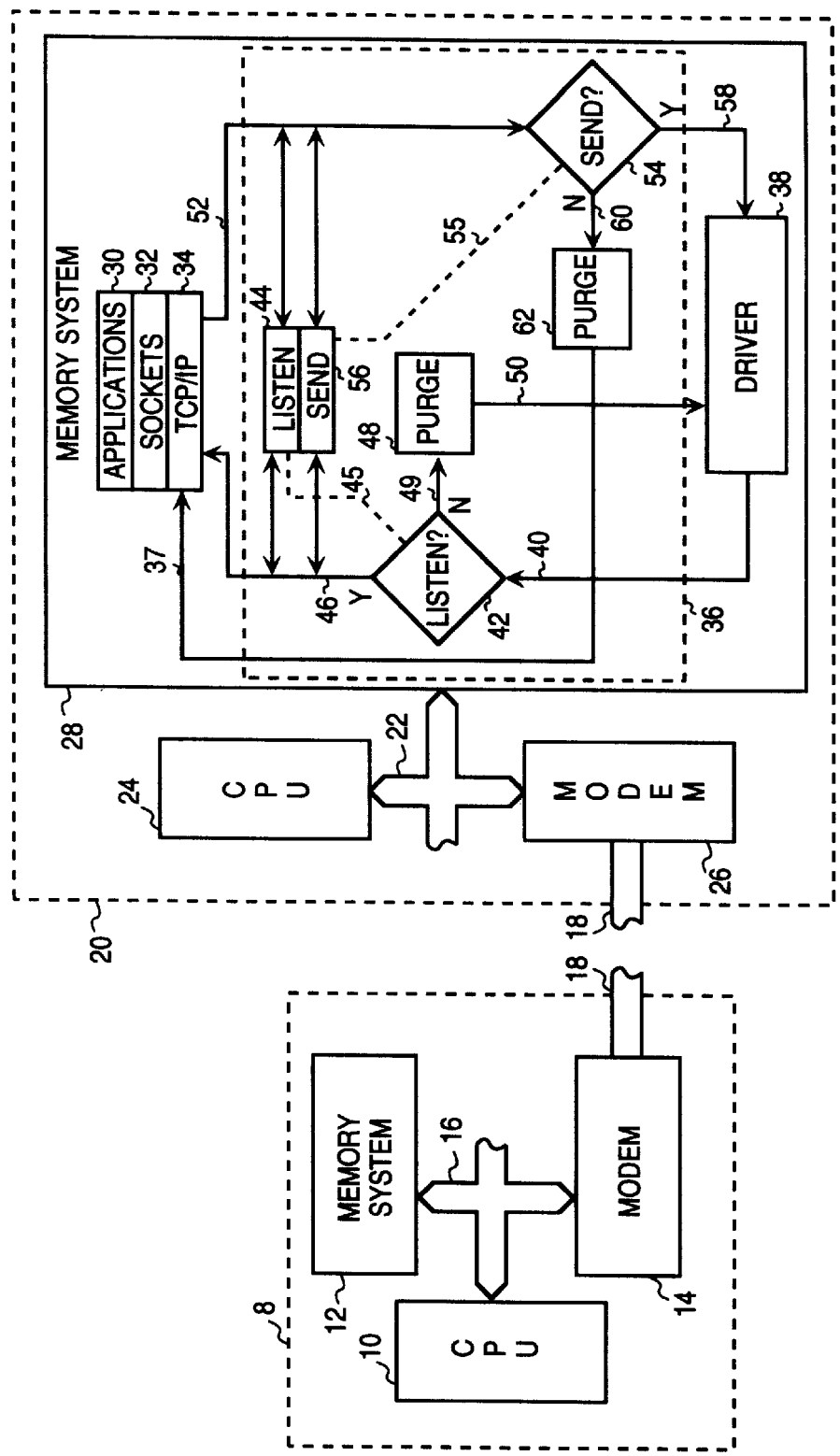
FIG. 1 is a block diagram of the system configuration of the present invention.

FIG. 1 is a block diagram of the system configuration of the present invention. Referring now to FIG. 1, server 8 has a CPU 10, a memory system 12 and cable modem 14 communicating with each other over bus 16. Server 8 acts as a point of presence ("POP") and provides high-speed data services. In operation, data packets are assembled by server 8 and passed on to cable modem 14 which puts the data packets on cable 18. Some packets are intended to be received by all clients. Other packets are targeted for one or more specific clients.

A client system 20 includes a bus 22 to which a CPU 24 and cable modem 26 are connected. A memory system 28 is also connected to bus 22. Memory system 28 may be random access memory or a combination of random access memory and disk memory. Memory system 28 has the following elements stored in it which cooperate with CPU 24 to provide the desired results. Applications programs 30 provide the user interface. An applications interface layer 32, sometimes called sockets allows applications programs to communicate using a communications protocol such as TCP/IP layer 34. Applications interface 32 insures interoperability between any vendor's TCP/IP protocol layer and applications programs 30. The next element stored in memory system 28 is Transmission Control Protocol/Internet Protocol ("TCP/IP") protocol layer 34. This element performs a large number of functions including packetizing data by attaching a header and footer to a block of data to be transmitted over a network and setting up a two-way connection between server 8 and client 20. A relatively small slice of bandwidth is allocated for communication upstream from the client to the server and a large amount of bandwidth is allocated for transmissions in the other direction.

A shim layer illustrated by dotted line 36 communicates with the TCP/IP layer 34 and driver 38. Driver 38 is specific to cable modem 26. Its function is to initialize, configure and control cable modem 26 and is loaded at system boot time. Driver 38 binds with shim 36 by exchanging pointers.

Shim 36 is a Terminate and Stay Resident ("TSR") element located in memory system 28. It is situated logically between TCP/IP layer 34 and driver 38. It maintains function entry points to TCP/IP layer 34 and driver 38 and passes its own function pointers as entry points for TCP/IP 34 and driver 38. Shim 36 intercepts all data packet flow in both directions between cable modem 26 and applications programs 30.

When a packet is received by cable modem 26, it is passed on to driver 38. Driver 38 in turn stores the packet in a buffer in memory system 28 under its control and passes a packet received signal to shim 36 indicating that a packet has been received and gives its location in memory system 28. The passing of the packet received signal from driver 38 to shim 36 is illustrated as process path 40. Upon receipt by shim 36 of the packet received signal, the logic of the present invention intervenes. At decision block 42 the logic of the invention decides to either pass the packet on or reject it. The decision is based on the status of listen information 44 as illustrated by dotted line 45. If listen information 44 is enabled, the packet will be transferred on to the control of TCP/IP layer 34. In TCP/IP layer 34 the packet is checked for errors, stripped of its header and footer and passed on through socket 32 to application program 30. The passing of a packet from shim 36 to TCP/IP layer 34 is accomplished by passing the pointers to the stored packet from shim 36 to TCP/IP 34 and is illustrated by taking process path 46 from decision block 42.

If listen information 44 is not enabled, the packet is rejected. This is illustrated by taking the No branch path 49 from decision block 42 to process block 48. At process block 48 the rejected packet is purged. This is accomplished by sending a signal to driver 38 via signal path 50 indicating that the packet has been passed on, but not passing on the pointers to the packet along to TCP/IP 34 which is in this case the downstream element in the communication of packets. This allows driver 38 to reuse the buffer storing the packet for the next packet to be transmitted. This action effectively purges the marked packet from memory system 28 before it is passed from the control of shim 36.

In the case of data to be passed from client 20 to server 8, the data originates in application 30 and is passed down through socket 32 to TCP/IP protocol layer 34. At this stage the data is packetized and stored in a buffer controlled by application 30. A packet to be sent signal is then passed from TCP/IP 34 to shim 36 which is illustrated by process path 52. When the packet to be sent signal is received by shim 36, the logic of the invention determines whether to pass the packet on to driver 38 or to purge it. This is done at decision block 54 where the logic interrogates send information 56 to see if it is set. This is illustrated by dotted line 55. If yes then the packet is passed on to driver 38. This is accomplished by passing on the pointer to the packet as illustrated by signal path 58.

If on the other hand, send information 56 is not set, then the decision in decision block 54 is no, and signal path 60 is followed to processing block 62 where the packet is purged. In a manner analogous with incoming packets, this is accomplished by sending a signal along signal path 37 to application 30 indicating that the packet was sent, but not passing the pointers to the packet along to driver 38 which is the downstream element in the communication of packets. Thus, in fact the packet was not physically sent. However, this causes application 30 to free up the memory used to store the packet which effectively purges the packet. The signals sent from purge blocks 48 and 62 via signal paths 50 and 37 respectively are preferably in the form of a function call rather than a data packet.

In the preferred embodiment, listen information 44 and send information 56 are single bit flags residing in shim 36 and are under the control of application 30. In the preferred embodiment, information 44 and 56 are set by sending a packet addressed to the information.

According to another aspect of the invention, listen information 44 and send information 56 are not single bit flags that can only specify send or not send, listen or not listen. Rather the information is in each case a multi bit filter that can be used to test for any condition that the user desires. Arbitrarily complex filters could be provided that would let a packet through depending on its contents or other parameters such as the type of protocol. For example, the filter could allow only http or ftp protocol packets through and reject all other packets.

According to another aspect of the invention, information 44 and 56 are set by server 8 rather than or in addition to client 20. This may be conveniently accomplished since the information are set by packets. Thus, a ready communication mechanism exists for server 8 to set the information.

According to another aspect of the invention, either client 20 or server 8 may check the status of information 44 and 56. This is accomplished by sending a request packet.

According to yet another aspect of the invention, information 44 and 56 may only be set with password control. This may be accomplished, for example, by changing the packet format to include a key. Only if the key in the packet matches the key stored in cable modem 26 hardware will the operation be carried out.

Figure 2:
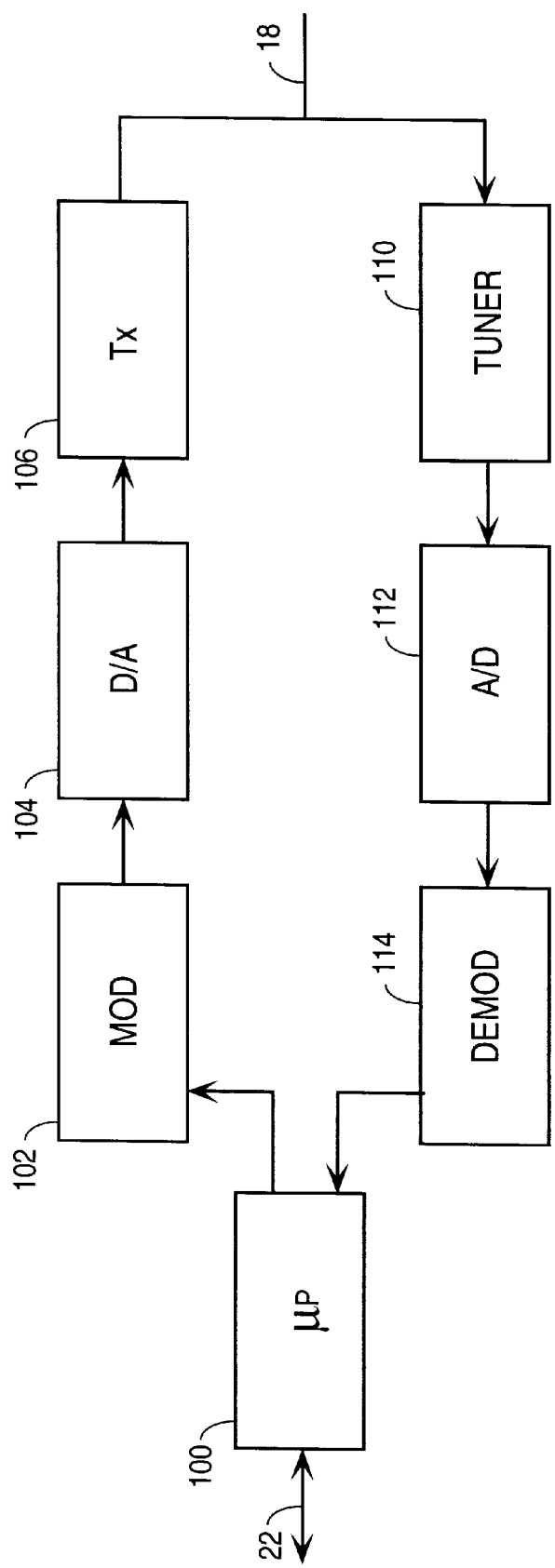
FIG. 2 is a block diagram of the cable modem.

FIG. 2 is a block diagram of cable modems 14 and 26. Referring now to FIG. 2, bus 22 is connected to microprocessor 100 which performs several modem functions including error checking, conversion of data from a word format to a serial format, encoding and management of the remaining modem components. On the transmit side of modems 14 and 26, the output of microprocessor 100 is connected to a modulator 102 which is in turn connected to a digital to analog ("D/A") converter 104 which is in turn connected to transmitter 106. Transmitter 106 is required since modems 14 and 26 are cable modems and must transmit data carried on a R/F carrier signal. The output of transmitter 106 is put on cable 18 of FIG. 1.

On the receive side of modems 14 and 26, tuner 110 is connected to cable 18 and is tuned to a particular frequency determined at set up time by microprocessor 100. The output of tuner 110 is connected to analog to digital converter 112 which is in turn connected to demodulator 114. Demodulator 114 supplies a serial stream of demodulated data bits to microprocessor 100 which reconverts them to word based data and puts the data on bus 22.

Figure 3:
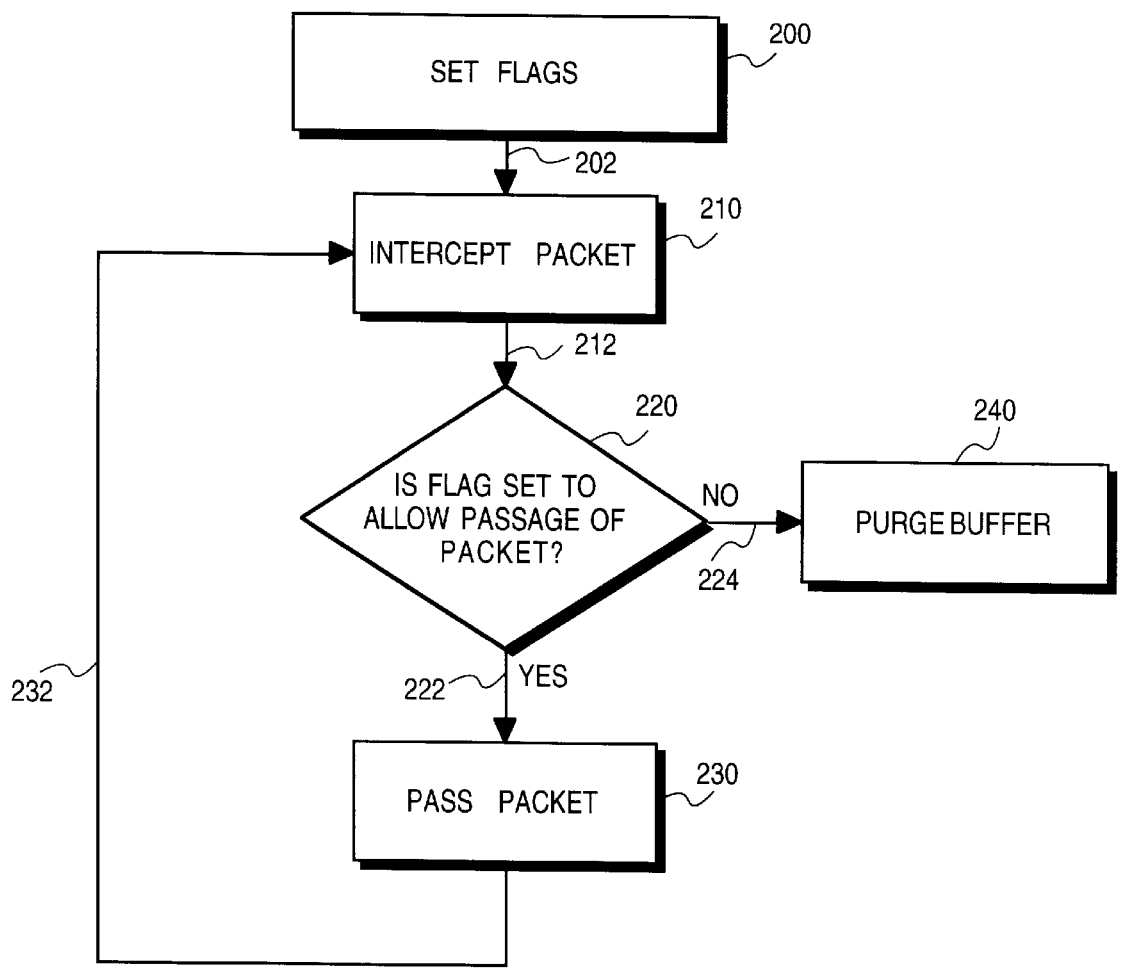
FIG. 3 is a flow chart of the method of the present invention.

FIG. 3 is a flow chart of the method of the invention. Referring now to FIG. 3, in process step 200, the user at the client computer sets listen information 44 to indicate whether they want to allow packets to be received. The user also sets send information 56 to indicate whether or not they wish to allow packets to be sent from the client upstream to the server. The setting of listen and send information 44 and 56 is done through applications software 30 on client 20 and by similar software on server 8. It is accomplished by sending packets. From process step 200, follow process path 202 to process step 210. Step 210 intercepts a packet of data coming either off of the cable or from the client computer. By intercept is meant that the logic of the invention intercepts the packet buffer storage pointers being transmitted from either TCP/IP 32 or driver 38, or from driver 38 to TCP/IP 34. From process block 210, follow process path 212 to decision block 220 which tests information 44 and 56 to determine if the packet is to be passed or rejected. If the packet is to be passed, follow process path 222 to processing block 230. In processing block 230 the data is passed from its temporary storage location to either the driver 38 or TCP/IP protocol 32 depending on whether the packet is coming or going. If the answer is no, then follow process path 224 to process block 240. At process block 240, a signal is sent either to driver 38 or to application 30 signaling a send complete. Upon receipt of this signal, either TCP/IP 32 or driver 38 purges the temporary buffer. Then follow process path 232 back to processing block 210 and intercept the next packet.

The foregoing preferred embodiment is subject to numerous adaptations and modifications without departing from the scope of the invention. Therefore, within the scope of the appended claims, the invention may be practiced other than as specifically described herein.

I claim:

1. In a method of controlling the transfer of a data packet between a client and server over a communication media that is not a switched point to point connection, the steps comprising:

storing transfer information in said client, said transfer information for determining if a packet is to be transferred further;

intercepting a data packet from a source;

temporarily storing said data packet;

testing said packet transfer information to determine if said packet is to be further transferred, allowing said packet transfer information to be set only if a key in the packet matches a key stored in a cable modem hardware unit of the client; and transferring or rejecting said intercepted packet based solely on the status of said transfer information regardless of the contents of said packet, said client controlling the transfer of said data packet between the source and the client based upon said transfer information in said client.

2. The method of claim 1 wherein the step of rejecting an intercepted packet comprises:

notifying the sending element that the packet has been sent without passing the pointers to the packet to the next down stream element in the packet sending process.

3. The method of claim 1 wherein said packet transfer information is stored by said client.

4. The method of claim 1 wherein said packet transfer information is stored by said server.

5. An apparatus for controlling the transfer of a data packet between a client and server over a communication media that is not a switched point to point connection, said system comprising:

a server computer system;

a cable modem connected to said server and to a cable data transmission media;

a client computer system;

a bus;

a CPU connected to said bus;

a memory system connected to said bus, said memory system containing:

transfer information for determining the acceptance of a packet for further transmission;

logic responsive to inputs for modifying said transfer information;

a buffer for storing said packet;

logic for interrogating said transfer information and determining if a packet is to be further transmitted;

logic for passing or rejecting data based solely on the status of said transfer information regardless of the contents of said packet, said memory system controlling the transfer of said data packet between the server computer system and the client computer system based upon said transfer information in said client, allowing said packet transfer information to be set only if a key in the packet matches a key stored in a cable modem hardware unit of the client.

6. The apparatus of claim 5 wherein said inputs are supplied by said client.

7. The apparatus of claim 5 wherein said inputs are supplied by said server.

8. An apparatus comprising:

a client and a server connected over a broadband data delivery infrastructure over which packets of data are transmitted;

a flag in said client the status of which is under user control;

logic in said client for intercepting a packet of data received over said delivery infrastructure;

logic in said client for temporarily storing said packet;

logic in said client for either passing or rejecting said packet based on the status of said flag regardless of the contents of said packet, said logic in said client controlling the transfer of said data packet between said client and server based upon said flag in said client, allowing said flag to be set only if a key in the packet matches a key stored in a cable modem hardware unit of the client.

9. The apparatus of claim 8 wherein said user control comprises logic in said client for modifying said flag.

10. The apparatus of claim 8 wherein said user control comprises logic in said server for modifying said flag.

11. The apparatus of claim 8 wherein said flag is located in memory in said client and control is exercised by an applications program in resident in said memory.

12. An apparatus comprising:

a client and a server in continuous mutual communication over a broadband network over which packets of data are transmitted, said client including a memory having:

a TCP/IP protocol layer;

a driver protocol layer;

a terminate and stay resident (TSR) shim layer having function entry points to said TCP/IP and driver layers and logic for passing its own function pointers as entry points for said TCP/IP and driver layers;

logic for receiving a packet received indication from said driver layer and a pointer to a location of said packet in said memory;

a flag in said memory that is under user control; and logic in said shim for either passing or not passing said pointer to said TCP/IP layer based on the status of said flag regardless of the contents of said packet, said logic controlling the transfer of said data packet between said client and server based upon said flag in said memory, allowing said flag to be set only if a key in the packet matches a key stored in a cable modem hardware unit of the client.

13. The apparatus of claim 12 further including:

logic for receiving a packet to be sent indication from said TCP/IP layer and a pointer to the location of said packet in said memory; and logic in said shim for either passing or not passing said pointer to said driver layer based on the status of said flag regardless of the contents of said packet.

* * * * *